UNITED STATES PATENT OFFICE.

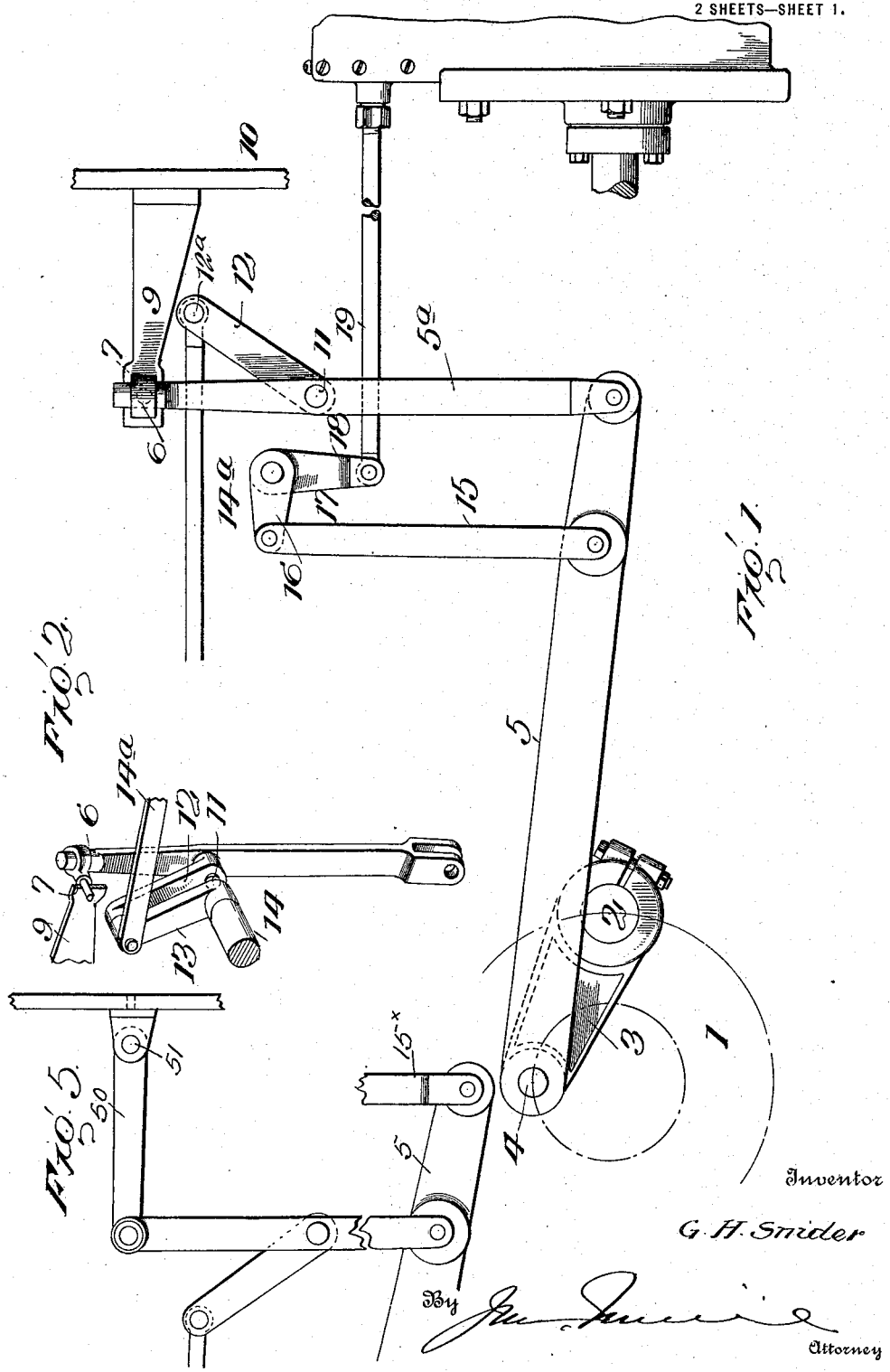

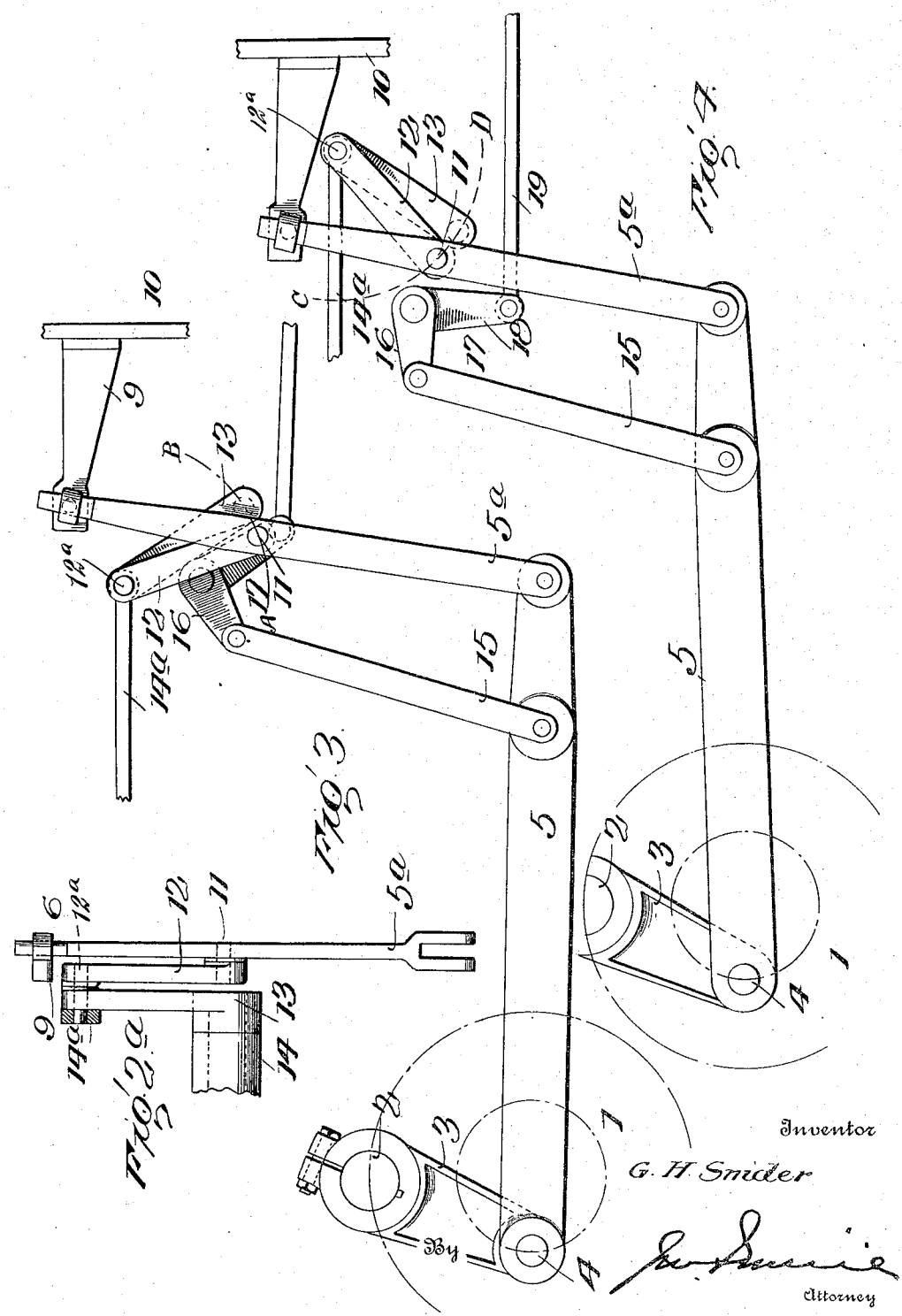

GILBERT HAVEN SNIDER, OF PULASKI, VIRGINIA.

VALVE-GEAR FOR LOCOMOTIVE OR OTHER ENGINES.

1,191,843.

Specification of Letters Patent. Patented July 18, 1916.

Application filed October 23, 1915. Serial No. 57,487.

*To all whom it may concern:*

Be it known that I, GILBERT HAVEN SNIDER, a citizen of the United States of America, residing at Pulaski, in the county of Pulaski and State of Virginia, have invented certain new and useful Improvements in Valve-Gears for Locomotive or other Engines, of which the following is a specification.

This invention relates to improvements in valve gears for locomotive or other engines.

One of the objects of the invention is to provide a valve gear structure where the parts will be accessible, and one having the various elements so arranged that friction and wear is reduced to a minimum.

A further object of the invention is to provide improved means for mounting the links, and more particularly the link rod for controlling the movement of the gear when shifting the valve from one position to the other.

The invention also comprehends improvements in the specific details of construction and arrangement of parts, which will be hereinafter described and particularly pointed out in the claims.

In the drawings:—Figure 1 is a side elevation of my improved valve gear, the parts being in a neutral position. Fig. 2 is a detail perspective view of the essential elements of the valve gear. Fig. 2$^a$ is a detail end elevation of the operating mechanism. Fig. 3 is a diagrammatic view of the valve gear, the wrist pin being at the full forward stroke and the reach rod pulled forward. Fig. 4 is a similar view, the wrist pin being in the same position, but the reach rod being shown in its full rearward position. Fig. 5 is a detail elevation of a different form of the invention.

To facilitate the description of the construction of the parts reference will be made particularly to Fig. 1, which shows the valve gear in its central or neutral position, the crank pin on the driving wheel being in a horizontal plane with the axis of the drive wheel.

1 indicates a drive wheel, and 2 the crank pin thereon. Mounted on the crank pin 2, and extending forwardly and upwardly at an angle therefrom is an auxiliary crank 3, provided at its free end with a wrist pin 4.

Pivoted on the wrist pin 4, extending rearwardly therefrom, is a pitman 5, to the rear end of which is pivoted a substantially vertical link rod 5$^a$. The upper end of the link rod slides in a bearing 6, which is pivoted at 7, in a horizontal bracket 9, extending from the usual yoke 10. By this construction the bearing 6 rocks in the bracket 9, at the same time the link rod slides during the operation of the valve gear, as will appear later on. Pivoted at a suitable point, as at 11, to the link rod, is a crank lever 12, and to the upper end of this crank lever 12$^a$ is pivoted a second crank lever 13, mounted on a rocker shaft 14, the axis of which is in alinement with the axis of the pivot 11, when the parts are in central position. A reach rod 14$^a$, is connected to the upper end of the second crank lever 13.

Pivoted to the pitman 5, a short distance in advance of the link rod 5$^a$, is a link 15, the upper end of which is pivoted to the horizontal leg 16 of a bell crank lever 17, suitably mounted on the frame. To the lower end of the vertical member 18, of the bell crank lever is pivoted the valve stem 19, which is connected to a valve (not shown). Of course, it is to be understood that the valve gear described is duplicated on the opposite side of the rocker shaft.

Let it be assumed the crank pin 2 has been moved a quarter turn from the position shown in Fig. 1, as shown in Figs. 3 and 4, this being a better location to illustrate the movement of the various levers than that shown in Fig. 1. Now if it be desired to shift the gear from the central position shown in Fig. 1, the reach rod is pulled forward which sets the various parts of the gear, as shown in Fig. 3. That is, when the second crank lever is rocked by the rock shaft the upper arc of its travel acts to displace the pivot point 11 from alinement with the axis of the rocker shaft, and forces the link rod down, the pivot 11 then traveling in the arc A—B, in Fig. 3, when the engine is working. In this movement the link rod both slides and rocks in its swivel bearing, and at the same time it lowers the pitman 5, relative to the position shown in Fig. 1. Because of the pitman 5 moving down on its wrist pin as a fulcrum it draws down the link 15, and through the bell crank lever 17, moves the valve stem 19, rearwardly. The parts when in this position are clearly shown in Fig. 3. As the crank pin rotates, it reciprocates the pitman 5, which in turn oscillates, and causes the link rod 5$^a$ to slide in the swivel bearing. The parts are so constructed and timed, that during the movement of the link rod 5ª, the crank 12 will rock on the pivot 12ª, the pivot 11 traversing the arc A—B, so that in any position of the wrist pin, or the reach rod, the mechanism may be freely moved without binding. If it be desired to reverse the engine, the reach rod is pushed rearwardly to the position shown in Fig. 4. When this occurs, assuming the wrist pin remains in the same position shown in Fig. 2, it follows that the pivot 11, with reference to the axis of the rock shaft will be elevated, due to the arc traveled by the pivot 12ª, and the position of the pivot point between the link rod and the pitman 5. Hence, the pivot 11 will traverse the arc C—D, shown in Fig. 4 when the engine is working. Under these circumstances the link rod will be elevated, hence the link 15, will be correspondingly elevated, and through the bell crank lever 17 the valve stem will be drawn forward. When the parts are in this position, the operation of the valve mechanism is the same as that previously described.

From the foregoing description, it will be seen that the link rod, while supporting the pitman simultaneously, rocks and slides in definite paths of movement, according to the position of the reach rod, the path of movement being governed by the crank 12, and the swivel bearing. This construction has been found to be effective and practical in operation, and because of its simplicity, liability of wear, and undue friction, are avoided.

In Fig. 5, the upper end of the link rod is pivoted to an auxiliary link 50, pivoted at 51 to a bracket on the yoke. The valve link 15ˣ is pivoted to the pitman 5, near the rear end of the latter, the operation of the parts being substantially the same as in the preferred construction.

The slight differences in structure accomplish improved results under certain circumstances, it not being thought necessary to detail same.

What I claim is:—

1. In a steam engine valve gear, the combination of a rocker shaft, means for simultaneously reciprocating and oscillating a pitman, a pitman connected to said means, a link rod pivoted to the pitman, a bearing in which the free end of the link rod slides, means for mounting the bearing to permit it to rock with the movement of the link rod, crank levers between the rocker shaft and the link rod to raise and lower same, and valve operating mechanism connected to the pitman.

2. In a steam engine valve gear, the combination of a rocker shaft, means for simultaneously reciprocating and oscillating a pitman, a pitman pivoted to said means, a link rod pivoted to the free end of the pitman, a swiveled bearing in which the link rod is mounted, a crank lever pivoted at its lower end to the link rod, a second crank lever extending from the rocker shaft and pivoted at its upper end to the first mentioned crank lever, a valve stem, and operating mechanism between the pitman and the valve stem.

3. In a steam engine valve gear, the combination of a rocker shaft, means for simultaneously reciprocating and oscillating a pitman, a pitman connected to said means, a link rod pivoted to the pitman, means for mounting the link rod to slide and to rock when the pitman is operated, a crank lever pivoted to the link rod, the pivot of said crank lever being in alinement with the rock shaft when the said link rod is in central position, a second crank lever pivoted at one end to the first mentioned crank lever and at its opposite end to the rocker shaft, a rod for rocking the rocker shaft, a valve stem, and a series of links between the pitman and the valve stem whereby the position of the valve may be changed by movement of the reach rod.

4. In a steam engine valve gear, the combination of means for simultaneously reciprocating and oscillating a pitman, a pitman pivoted to said means, a link rod pivoted to the pitman, a rocking bearing in which the link rod slides when the pitman is moved, a valve stem, links between the pitman and the valve stem, and means for supporting the link rod for moving same to change the position of the valve stem.

5. In a steam engine valve gear, the combination of means for simultaneously reciprocating and oscillating a pitman, a pitman pivoted to said means, a link rod pivoted to the pitman, a pivoted bearing having a guide in which the upper end of the link rod slides, a rocker shaft, a crank lever extending from said rocker shaft, a second crank lever pivoted to the first mentioned crank shaft and to the link rod, a reach rod for operating the rocker shaft, a valve stem, a bell crank lever pivoted to the valve stem, and a link pivoted to the bell crank lever and the pitman.

6. In a steam engine gear, the combination of a rocker shaft, means for simultaneously reciprocating and oscillating a pitman, a pitman connected to said means, a link rod pivoted to the pitman, means for mounting the opposite end of the link rod to permit same to raise and lower and to swing, a crank having a trunnion, said trunnion being in alinement with the rocker shaft, the link rod being mounted on the trunnion, a second crank pivoted at its free end to the free end of the first mentioned crank and mounted at its opposite end on the rocker shaft, means for operating the rocker shaft to cause the cranks to raise and lower the pitman, and valve operating mechanism connected to the pitman.

7. In a steam engine valve gear, the combination of a rocker shaft, a pitman, a link rod pivoted to the pitman, a fixed support, a connection between the link rod and the fixed support to permit said link rod to move longitudinally and rock laterally, a crank pivoted to the link rod intermediate the length of the latter, said pivotal connection being in alinement with the rocker shaft, a second crank pivoted to the free end of the first mentioned crank, the opposite end of the second mentioned crank being pivoted to the rocker shaft, means for operating the rocker shaft to cause the crank to change the position of the pitman, and valve operating mechanism connected to the pitman.

In testimony whereof I affix my signature in the presence of two witnesses.

GILBERT HAVEN SNIDER.

Witnesses:
G. C. HALL,
J. L. JAMISON.

Copies of this patent may be obtained for five cents each, by addressing the "Commissioner of Patents, Washington, D. C."